United States Patent
Ross et al.

(10) Patent No.: US 6,757,590 B2
(45) Date of Patent: Jun. 29, 2004

(54) CONTROL OF MULTIPLE FUEL CELL POWER PLANTS AT A SITE TO PROVIDE A DISTRIBUTED RESOURCE IN A UTILITY GRID

(75) Inventors: Ricky M. Ross, South Windsor, CT (US); Francis A. Fragola, Jr., Wallingford, CT (US); Herbert C. Healy, Windsor, CT (US); Douglas Gibbons Young, Suffield, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 434 days.

(21) Appl. No.: 09/808,762

(22) Filed: Mar. 15, 2001

(65) Prior Publication Data

US 2002/0169523 A1 Nov. 14, 2002

(51) Int. Cl.[7] .............................................. G05D 11/00
(52) U.S. Cl. ........................... 700/286; 700/22; 429/12; 429/13
(58) Field of Search ..................... 700/22, 286; 307/64; 429/12, 19, 21, 22, 23, 92, 93, 99, 122, 123, 13

(56) References Cited

U.S. PATENT DOCUMENTS

| | | | |
|---|---|---|---|
| 4,004,947 A | 1/1977 | Bloomfield | 429/17 |
| 5,401,589 A | 3/1995 | Palmer et al. | 429/13 |
| 5,573,867 A | 11/1996 | Zafred et al. | 429/17 |
| 5,579,197 A | 11/1996 | Mengelt et al. | 361/93 |
| 5,750,278 A | 5/1998 | Gillett et al. | 429/24 |
| 5,783,932 A | 7/1998 | Namba et al. | 322/16 |
| 6,011,324 A | 1/2000 | Kohlstruck et al. | 307/64 |
| 6,288,456 B1 * | 9/2001 | Cratty | 307/64 |
| 6,510,369 B1 * | 1/2003 | Lacy | 700/295 |

FOREIGN PATENT DOCUMENTS

WO   WO 99/60687   11/1999

* cited by examiner

Primary Examiner—Leo Picard
Assistant Examiner—Carlos R. Ortiz
(74) Attorney, Agent, or Firm—Stephen A. Schneeberger

(57) ABSTRACT

A site management system (11) is provided for a power system (8) at site in a utility distribution grid (10). The power system (8) includes multiple fuel cell power plants (18) and one or more loads (14), for selective connection/disconnection with the grid (10) The site management system (11) controls the power plants (18) in an integrated manner, alternatively in a grid connected mode and a grid independent mode. The multiple power plants (18) at the site may be viewed and operated as a unified distributed resource on the grid (10). The site management system (11) provides signals representative of the present power capability (Kw Capacity—88) of each of the power plants (18), and a signal (Total Kw Capacity—95) representative of the total present power capability at the site. These power representations are used to appropriately assign power dispatch loadings to the respective fuel cells (18) in the grid connected mode and in the grid independent mode, and may also be used for load shedding.

17 Claims, 3 Drawing Sheets

CONTROL OF MULTIPLE FUEL CELL POWER PLANTS AT A SITE TO PROVIDE A DISTRIBUTED RESOURCE IN A UTILITY GRID

CROSS-REFERENCE TO RELATED APPLICATION

Reference is made here to related, patent application U.S. Ser. No. 09/782,402, filed Feb. 13, 2001 for System for Providing Assured Power for a Critical Load by the same inventive entities as herein and owned by the same assignee as herein, now U.S. Pat. No. 6,465,910 issued Oct. 15, 2002, which application/patent is incorporated herein by reference to the extent necessary, if at all, to provide essential and/or nonessential material.

TECHNICAL FIELD

This invention relates to the control of fuel cell power plants, and more particularly to the control of multiple fuel cell power plants at a site. More particularly still, the invention relates to the control of multiple fuel cells at a site to provide a distributed resource in a utility grid.

BACKGROUND ART

Individual fuel cells have been used both experimentally and commercially in various configurations to power various electrical loads. In the main, the applications have relied on a single fuel cell, or fuel cell power plant, to supply electrical power to one or more loads at the site. While such sites may be mobile, as in the powering of the electric drive motor of a vehicle, in the main they are large and stationary. These applications have typically been individual commercial installations or buildings, perhaps involving computers or similar electronic data processing equipment or medical equipment requiring a reliable source of power.

To operate such fuel cell power plants, there are normally associated various controls for the direct control of the fuel cell itself and its production of DC electrical power, as well as additional controls for converting the DC power to AC power, for connecting and disconnecting power with the loads, etc. In some instances, the fuel cell power plant is connected to the loads in parallel with the normal electric utility grid, and may act in lieu of, or in addition to, the grid to supply power to the loads. In other instances, there may be multiple fuel cell power plants at a site, collectively connected to the loads in parallel with the utility grid. However, even in such configuration, the control of the fuel cells has typically been on an individual basis, with little or no provision for an integrated control arrangement to optimize the use of multiple fuel cell power plants interconnected with the utility grid and the loads.

When one or more fuel cell power plants are connected to the utility grid as well as the loads, they are said to be in a grid connected (GIC) configuration or mode. Alternatively, when those fuel cell power plants are connected only to the loads, they are said to be in grid independent (G/I) mode. In the G/I mode, the fuel cell power plants typically follow the load and apportion the load among the power plants. The transition from one such mode to the other, and the control of multiple fuel cell power plants relative to the loads present additional control complexities that have impeded the efficient and economic utilization of multiple fuel cell power plants as distributed resources in electric utility grids.

Accordingly, it is an object of the invention to provide a control arrangement for the efficient and economic utilization of multiple fuel cell power plants at a site as a distributed resource in a utility grid.

It is a further object of the invention to provide a control arrangement to optimize the interrelationship between multiple fuel cell power plants and multiple loads at a site in order to enhance utilization of the plants as a distributed resource in a utility grid.

It is a still further object to provide a control arrangement for a multiple fuel cell power plant generation system at a site that coordinates operation of the fuel cell power plants in an integrated, or unified, manner in both the G/C and the G/I modes of operation.

DISCLOSURE OF INVENTION

The present invention concerns the control of multiple fuel cell power plants at a site, particularly as a distributed resource for inclusion in a utility grid. The invention further concerns the unified, or integrated, control of multiple fuel cell power plants at a site, both in a grid connected (G/C) mode to facilitate their use as a distributed resource in a utility grid network and in a grid independent (G/I) mode to optimize their value and utility as an/the independent power supply to one, or typically multiple, customer loads at the site.

Accordingly the present invention relates to a fuel cell-powered generating system at a site for inclusion as a distributed generating resource in a distributed generation utility power grid, and comprises multiple fuel cell power plants at the site, at least one, and typically multiple, loads located substantially at the site, and a site management system operatively connected to the multiple fuel cell power plants, the one or more loads, and the utility grid for controlling the fuel cell power plants in an integrated, or unified manner, in, alternatively, a grid connected mode of operation having the fuel cell power plants connected to the load(s) and to the power grid, and a grid independent mode having the fuel cell power plants connected to the load(s) independent of connection to the power grid. This integrated control provided by the site management system allows the utility to view the multiple fuel cell power plants at the site as a single, or unified, distributed generating resource when connected to the grid. Accordingly, as used in this context, the terms "integrated" and "unified" are viewed as being substantially synonymous. Moreover, the integrated control facilitates the operation of the site in the G/I mode where the fuel cells are typically load-following and have operated independently of one another. In this latter regard, the integrated control in the G/I mode further facilitates a load management (sharing and shedding) capability for assuring power to critical loads.

The fuel cell power plants each include control and logic capabilities for folding back (reducing) rated power levels to lesser levels, if necessary, in response to various power plant conditions, and for providing signals representative of the instant power level capability of the respective plants. As used herein in association with power capacity and load demand, the term "instant" is intended to be synonymous with "present", "current", or "instantaneous". The site management system sums the individual power capacities of the respective fuel cell power plants and obtains a measure of the total instant power capacity of the multiple power plants at the site. This measure of total power capacity and the respective individual power capacity measures are used to provide a site power measure to the utility grid and to appropriately load each of the power plants in G/C mode, and are used in the G/I mode to appropriately load each of the power plants to operate in a unified manner and further, for a load shedding function. In this latter regard and assuming multiple loads, the site management system is operative to recognize the instant load demand, the instant total power capacity, and a predetermined prioritization of the loads in the event load demand exceeds instant total power capacity, and to selectively shed or disconnect loads in accordance with the schedule, if necessary.

The site management system includes at least one, and typically several, signal processing logic controllers cooperatively interacting with one another, the multiple fuel cell power plants, and the utility grid to perform the integrated control functions of the invention.

The foregoing features and advantages of the present invention will become more apparent in light of the following detailed description of exemplary embodiments thereof as illustrated in the accompanying drawings.

BEST MODE FOR CARRYING OUT THE INVENTION

Figure 1:
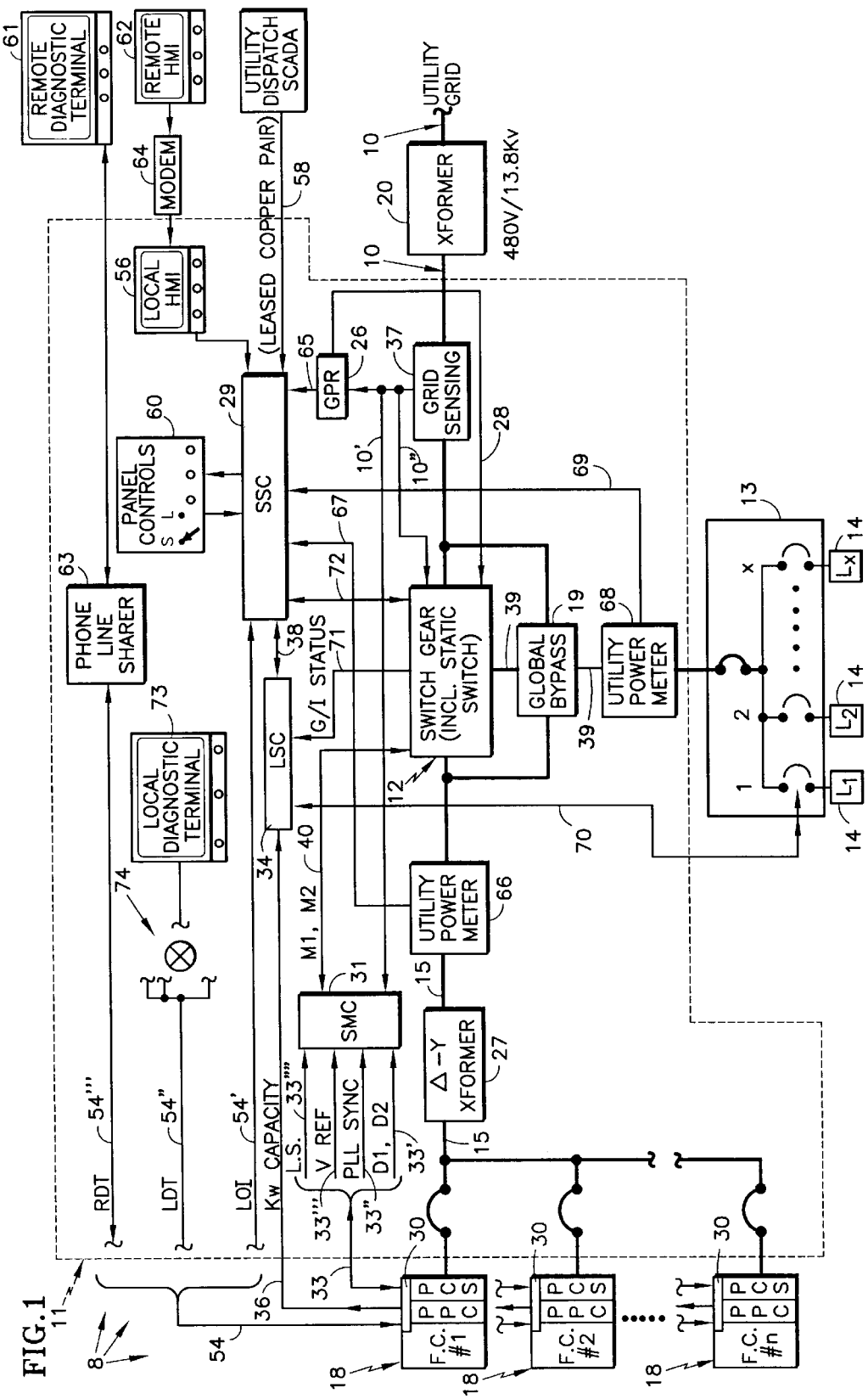
FIG. 1 is a simplified schematic block diagram of a power system, employing multiple fuel cell power plants at a site, as a distributed resource in a utility grid system and a backup power source to one or more loads located at the site when the grid is unavailable.

Referring to FIG. 1, there is depicted a simplified block diagram of a fuel cell-based power system 8 in accordance with the invention, which is readily available and utilized at a site as a distributed resource in a utility grid system. The power system 8 is connected to utility grid bus 10, and employs multiple fuel cell power plants 18 located at a common site, for supplying, with the grid 10, 3-phase power to, and through, load contactor array 13 to loads 14, usually also at the same site. In the preferred and normal instance, the fuel cell power plants 18 provide power to the loads 14 on a substantially continuous basis, irrespective of occasional disconnects of the utility grid 10 from the power plants 18 and loads 14. Switching gear, generally designated 12 and described below, includes a static switch that rapidly opens during utility grid disturbances to isolate the loads 14 and the fuel cell power plants 18 from the grid 10, and the fuel cells provide substantially continuous power to the loads during these disturbances. For simplicity, a "single line" diagram, or representation is used herein to depict the 3-phase supply lines, as well as their included switches and other circuit components. Similarly, with respect to the control circuitry forming part of this invention, it will be understood that single-line representations have often been used for twisted pairs, or grouped parallel leads, which serve as signal conductors. For convenience of explanation and visual distinction, the portions of the schematic carrying the relatively higher voltage/current/power to the loads 14 are bolded, in contrast with the lower-voltage, control portions of the system 8.

The grid 10, the fuel cell power plants 18, and the loads 14 are interconnected and controlled through a Site Management System (SMS), represented by broken line block 11. The loads 14, here designated $L_1, L_2, \ldots L_x$, are those of the customer at the site, and typically include one or more "critical" loads, such as computers, electronic data processing devices, and/or medical devices, that require a substantially continuous supply of power. Others of those loads 14 may be less critical, being able to tolerate brief or longer-term power interruptions. In a typical contactor array 13, there may be 12 individual, separately-controllable, contactors i.e., 1, 2, . . . X, with respective loads $L_1, L_2 \ldots L_x$ connected to a terminal thereof. Selective actuation of the individual contactors may be used to selectively connect and disconnect the respective loads from the power sources, as will be described hereinafter.

The utility grid bus 10, following step-down by transformer 20, normally provides power at 480 Vac and 60 Hz, as also do the fuel cell power plants 18 via lead, or bus, 15, through the delta-to-wye transformer 27. Switching gear, 12 serves to interconnect the fuel cell power plants 18 through bus 15, the loads 14 through a load power bus 39, and the utility grid 10. In this way, the fuel cell power plants 18 (or simply "fuel cells 18" or "power plants 18") are available and connected for supplying power on a full time basis to the loads 14 or to the loads 14 and utility grid 10, for economical usage of the fuel cells. The switching gear 12 preferably includes a high current capacity, high speed, static (solid-state) switching arrangement and several inter-tie or breaker switches (not shown), as described in the aforementioned application U.S. Ser. No. 09/782,402, now U.S. Pat. No. 6,465,910. The static switch, which may be pairs of counter-connected, silicon controlled rectifiers, serves as the main operational switch, and is closed during normal operation of the grid 10, to connect the grid 10 with the power plants 18 and loads 14, and is open if the grid goes out of limits or if an "enable" signal is removed. The breaker switches are typically electromechanical and may be automatically or manually actuated to selectively provide bypass paths around the static switch and/or to open otherwise closed paths. Global bypass breakers 19 connected to busses 15, 10 and 39, serve, when manually closed, to further bypass the switching gear 12, as during maintenance or a start-up or shutting down operation.

There are multiple fuel cell power plants 18 at the site, and it is the integrated control of and/or involving, those multiple power plants 18 which comprises the present invention. In an exemplary arrangement, five (5) such power plants 18 are located at the site and controlled by the SMS 11. Each power plant 18 is a 200 kw International Fuel Cells, LLC (formerly ONSI) PC25™C power plant, with the five units collectively being capable of providing up to 1 megawatt of power. Each such power plant 18 includes the basic fuel cell (F.C.), a Power Plant Controller (PPC), and a Power Conditioning System (PCS) which includes its own separate controller. The fuel cell, F.C., includes (not shown) a fuel stack assembly, ancillary fuel processing and delivery equipment, oxidant delivery equipment, and a water and steam management system, as is generally well known. The PPC includes the controls, logic and monitoring equipment directly associated with the operation and control of the respective F.C., as generally known, and including additional provision for evaluating the present power generating capability of the power plant 18, as will be described. The PCS contains a solid-state inverter and its controller which converts DC power to AC power at the desired voltage and frequency. Control of and by the PCS, as through its associated controller and the other controllers to be hereinafter discussed, further enables conversion of the mode of operation of a power plant 18 from G/C to G/I, and vice versa, as is generally known and will be better understood by reference to the aforementioned application U.S. Ser. No. 09/782,402, now U.S. Pat. No. 6,465,910. When used in G/C mode, the variable controlled by the PCS is power delivered (both real and reactive). When used in the G/I mode, the variables controlled are output voltage and frequency, and, if multiple power plants 18 are involved, phase. The output voltage of a three-phase system is, of course, controlled to be at a phase angle of 120° between each phase. The outputs of the several fuel cell power plants 18 are collectively joined by bus 15. Control signals may be exchanged between the several component portions of a power plant 18, i.e., the F.C., PPC, and PCS, via one or more signal paths, here collectively depicted for convenience as a common signal bus and I/O port 30.

In addition to the switching gear 12, the SMS 11 for the site includes three controllers which are responsible for coordinating integrated operation of the multiple power plants 18, first with respect to each other and with respect to the customer loads 14, and ultimately as a single power resource with respect to the utility grid.

A Site Management Controller (SMC) 31 provides direct control of the PCSs of the fuel cells 18 in response to mode indicating/controlling signals M1 and M2 Image Page 4 on lead 40 from logic associated with the static switch of switching gear 12, and further in response to a grid voltage reference signal 10' provided by grid sensing circuitry 37. The grid sensing circuitry 37 typically includes a potential transformer (sensor) and a current transformer (sensor) to sense the voltage and current of grid 10 and provide respective signals thereof. The mode signals M1 and M2 from switching gear 12 are indicative of switching of the static switch, and thus the need for a mode change from G/C to G/I, or vice versa. Logic associated with the static switch receives a signal via lead 10" from the grid sensing circuitry 37 and determines whether the grid is within limits or not. A change in this condition acts through the logic to "toggle" the static switch, as described in the aforementioned application U.S. Ser. No. 09/782,402, now U.S. Pat. No. 6,465,910, and to signal such action via the M1 and M2 signals on lead 40. The SMC 31 also includes provision for issuing load share control signals to each of the PCSs of the respective fuel cells 18, to apportion the load among the fuel cells 18 during load following operation in the G/I mode. That load sharing typically takes into account the present power generating capacity of each fuel cell 18, as provided by status signals from the fuel cell power plants 18, and apportions the load accordingly amongst them.

The SMC 31 is typically composed of computers, programmable logic, sensors, and control circuitry. The combination of the mode signals M1 and M2, and the information about grid voltage, phase and frequency provided on lead 10', serve in the SMC 31 to provide, as outputs, further mode control signals D1 and D2 on lead 33', a phase lock loop sync signal on lead 33", and a voltage reference signal on lead 33'''. A signal bus 33 exchanges these control signals between the SMC 31 and the PCSs of the several power plants 18. The signal bus 33 also conveys, between the SMC 31 and each of the PCSs, the several load share status and control signals collectively represented as lead 33'''' to/from the SMC 31. These signals are used to apportion the load among the fuel cells 18 during load-following operation in the G/I mode. The "load sharing" algorithm takes into account the present power generating capacity of each fuel cell 18, as provided by status signals from the fuel cell power plants 18, and apportions the load accordingly amongst them.

The grid 10 voltage and current signals sensed by the grid sensing circuit 37 are also extended to a grid protection relay 26, which in turn is responsive to the grid voltage and current being in or out of limits to provide a control signal on lead 28. The lead 28 is connected to the switching gear 12, and the signal thereon serves to control one or more breaker switches in a manner to assure the load continues to have power during grid disturbances and also to protect the static switch, the grid 10, the power plants 18 and/or the loads 14 in the event of extreme conditions.

A second controller is the Load Shed Controller (LSC) 34, which is a programmable logic control comprised of appropriate standard integrated circuits. The LSC 34 provides high-speed load shed control in the G/I mode, as will be described below. The LSC 34 receives respective kilowatt (Kw) capacity signals from each of the power plants 18 (1 through n) via a signal bus 36, here collectively representative of all "n" of the signals. The respective Kw capacity signals are typically developed in the respective PPCs of each power plant 18, pass through the respective PCSs, and each extend to the LSC 34 via I.O. port 30 as a 4–20 ma signal via respective pairs, here collectively represented as lead 36. The development of the Kw capacity signals at the PPCs, and their eventual use in the various controls of the SMS 11, will be described below in greater detail. Suffice it to say at this juncture that the Kw capacity signals are a measure of the power generating capacity of the individual power plants 18, and find use in load sharing, load shedding, and in the overall control of the multiple power plants 18 as a unified, or singular, resource in a utility grid of distributed resources. Further, 2X signals (possibly 24 in number) are communicated between the LSC 34 and the X (possibly 12 in number) contactors 1 through X of the contactor array 13 via discrete signal lines, here represented for simplicity as a single lead 70. Half of these signals are representative of the status of the respective contactors, and the other half are responsible for controlling the opening or closing of the respective contactors. The LSC 34 also receives an indication, via lead 71 from the logic associated with the static switch of switching gear 12, of the mode status, and particularly entry into the G/I mode. This enables operativeness of the load shedding function in that mode, and vice versa.

The third controller is the Site Supervisory Controller (SSC) 29, which provides the operator interface for the power system 8, is responsible for integrated supervisory control of the system at a high level, and provides an interface between the customer (or operator) at the site and the utility. As with the LSC 34, the SSC 29 is a programmable logic control comprised of appropriate standard integrated circuits programmed to perform the required functions. A bus extender 38 connects the LSC 34 and the SSC 29 such that the two may be viewed collectively as a unit. The SSC 29 includes six interfaces with the remainder of the power system 8, as well as with the utility grid.

One of those interfaces is the interconnection of the LSC 34 with the SSC 29 via the bus extender 38. The LSC 34 communicates the 2X number of signals associated with contactor array 13 to the SSC 29 approximately every half second such that the SSC 29 has override capability of the customer load contactors 13 as well as monitoring the customer load status, when in G/I mode.

Another interface involves the communications between the SSC 29 and the individual power plants 18 via n pairs of Local Operator Interface (LOI) leads 54', only one being shown connected to the SSC 29, and the connection with the PPCs of the power plants 18 being represented, for simplicity, as but part of a cumulative, multiple path, diverse signal communication bus 54. These signals include those necessary for the routine supervisory control of the power plants 18, and are used to obtain data from the power plants 18 for both local display on the Local Human Machine Interface (HMI) 56 and for use at the utility dispatch Supervisory Control and Data Acquisition (SCADA) interface on lead 58 from/to the utility. A panel control 60 includes manual controls for various annunciators and, particularly, a mode switch input providing selection between a local operating mode (L) in which the power plants 18 are controlled individually, and a supervisory mode (S) in which the several power plants are operated as a unit. When the mode selector switch from panel control 60 is in the supervisory mode (S), as depicted in FIG. 1, both the Local HMI 56 and a Remote HMI 62 are inhibited from issuing control or dispatch commands. Then, all control and dispatch signals come from the utility's remote dispatch station (not shown) via the SCADA interface line 58, which is a Modbus remote terminal link comprised of a leased (dedicated) copper pair. The Remote HMI 62 is connected with a remote site, such as the power plant 18 manufacturer and/or the utility, by phone line through a local modem 64, and conducts data and control commands from and to the Power Plants 18 via leads 54 and 54''' only when the mode selector switch is in the local mode. The Local HMI 56 conducts data and control commands from and to the power plants 18 via leads 54 and 54', with the interaction of the SSC 29, only when the mode selector switch is in the local mode (L). The connection between the local HMI 56 and the SSC 29 represents a third interface with the SSC 29. Similarly, the Remote HMI 62 is connected with a remote site, such as the power plant 18 manufacturer and/or the utility, as by a phone line through a local modem 64, and conducts data and control commands to and from the power plants 18 via the Local HMI 56, the SSC 29, and the leads 54 and 54' only when the mode selector switch is in the local mode (L).

A fourth interface with SSC 29 involves the grid protection relay 26 via lead 65. This connection reports the status of grid 10, and any faults or out of limit conditions therewith, such as current, voltage, phase or frequency abnormalities, as discerned by grid sensing unit 37 and applied through the GPR 26.

A fifth interface with the SSC 29 involves the provision of signals indicative of the power delivery by the several power plants 18, by means of a utility power meter 66 connected to power bus 15 and having a signal lead 67 connected to SSC 29, and indicative of the power delivered to/drawn by the loads 14, by means of a utility power meter 68 connected to load power bus 39. The power meter 68 is connected to bus 39 intermediate the contactors 13 and the global bypass 19, and has a signal lead 69 connected to SSC 29. The power meters 66 and 68 each typically include a potential (voltage) sensor and a current sensor (neither shown) for cumulatively determining power. These power readings are used by the SSC 29 and the LSC 34 for control actions to be hereinafter explained.

The sixth interface involves 2-way communication between the SSC 29 and the switching gear 12, as represented by the lead 72. The SSC 29 may provide discrete signals to the static switch control and to selected breaker switches to allow it to select the operating mode of the SMS 11 if necessary. Similarly, those switches return respective status signals to the SSC 29. The SSC 29 may provide an "enable" signal to the static switch, and when present allows the switch to operate autonomously based on the condition of grid 10 at the time. When the signal is "disabled", it forces the static switch to open and cause power system 8 to operate in the G/I mode.

A local diagnostic terminal 73 is connected selectively through an "n-way" switch 74 and leads 54'' and 54, to the individual ones of the n-number of power plants 18 for obtaining diagnostic data. Also included is a remote diagnostic terminal (RDT) 61 connected through an "n-way" phone line sharer 63 to the individual n-number of power plants 18, via leads 54 and 54''', for similarly obtaining diagnostic data.

Figure 2:
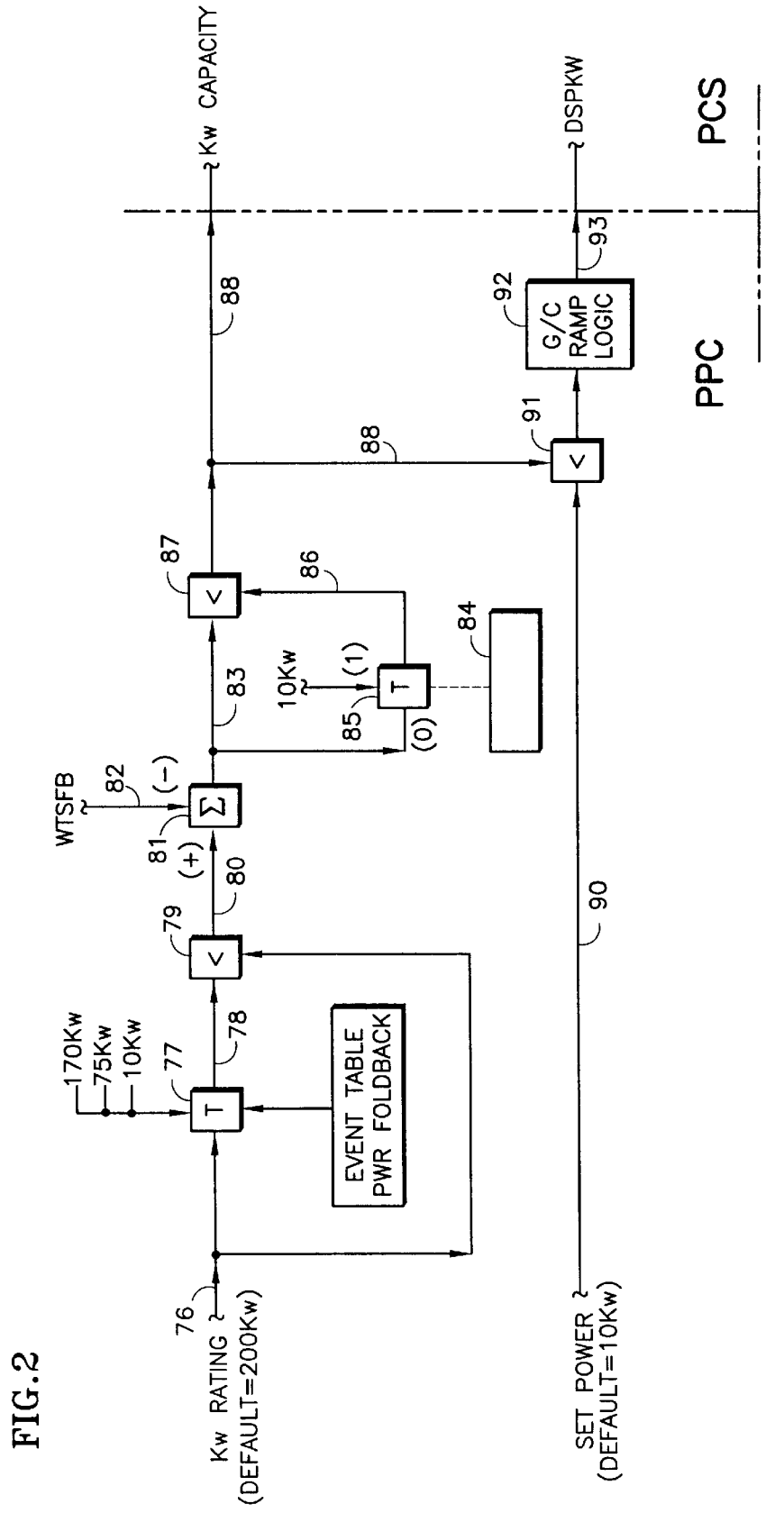
FIG. 2 is a generalized, functional schematic block diagram illustrating the development of a signal representative of the present power generating capacity of a respective fuel cell power plant.

Reference is now made to FIG. 2, which depicts a generalized functional schematic block diagram of the development, in the PPC of a respective power plant 18, of a Kw capacity signal (Kw Capacity) indicative of the present power generating capacity of the respective fuel cell power plant 18. This signal is then used, both on an individual plant basis and on a cumulative power system 8 basis, to enable and facilitate remote dispatch of power requirements by the utility in the G/C mode, as well as load sharing and load shedding capabilities in the G/I mode. A Kw rating value (KwRATING) is initially assigned to a respective fuel cell power plant 18, as represented on input lead 76 to an Event Table 77. The KwRATING signal has a normal default value of 200 Kw, which assumes the fuel cell and plant are operating, or operable, at full capacity. This value may be adjusted by an operator or the manufacturer to reflect a lesser value in view of predetermined circumstances which may degrade performance of the plant by a prescribed amount. The Event Table 77 contains several power foldback values, each of which correspond with one or more "abnormal" conditions in the operation of the fuel cell F.C. portion of the power plant 18. For instance, for conditions of low steam to fuel ratio in the fuel cell system, the power rating may be folded back to 170 Kw, and for conditions such as inability to satisfy fuel demand, insufficient make-up water, excessive fuel cell cabinet temperature, etc., the foldback may be greater, to a Kw rating of only 75 Kw. These foldback power values (and others) are depicted on the scale appearing at the top of table 77, whereas in fact the table serves to correlate a sensed condition with a predetermined foldback power rating and provide as an output, a signal on lead 78 which is representative of a folded back power rating. This signal is applied to a lesser select function 79, which has as its other input the initial KwRATING value from lead 76. The lesser power value of the signals on leads 76 and 78 is then provided as the output on lead 80. A further possible power foldback may be made at the summer 81, which receives a (+) input from lead 80 and may receive a (−) input on lead 82. The lead 82 contains any power foldback magnitude resulting from a sensed abnormality in the water treatment system for the fuel cell, and that foldback magnitude is variable and may range from a power decrease of as little as 0 Kw to as much as 190 Kw. In this instance, the value appearing on lead 80 will be reduced by the value appearing on the lead 82, to provide a resultant output on lead 83. The value on lead 83 may also, or further, be folded back, or overridden if the fuel cell water treatment system is placed in a maintenance mode. This potential override results when a water treatment maintenance mode signal 84 is applied to a Table 85, which Table is scheduled to provide, as an output on lead 86, either the value on lead 83 if the water treatment is operating normally or a preset folded back value of only 10 Kw if the mode signal on 84 indicates the maintenance mode. The value on lead 86 is compared with that on lead 83 at the lesser select function 87, and the lesser value is then provided as the Kw Capacity signal on lead 88. Thus it will be realized that under normal operating circumstances and conditions, the Kw Capacity signal may be as large as 200 Kw; whereas if one or more of the other conditions arise or exist, the rating will be folded back to a value between 200 kw and 10 kw, accordingly. This, then, represents the power generating capacity of that power plant 18 at that moment. The various contributing parameters are monitored at least as frequently as 0.5 sec. such that the Kw Capacity signal may be updated and sent every 0.5 seconds.

Referring further to FIG. 2, a Set Power value (designated 112 in FIG. 3 below) is applied to lead 90, and is the result, for a single power plant, of the total power dispatch signal (designated 97 in FIG. 3 below). The total dispatch is apportioned among the multiple power plants in accordance with the algorithm to be described with respect to FIG. 3, and the resulting Set Power is indicative of a desired or commanded level of power output from the respective single ones of the power plants 18. This total dispatch value may be set by the utility via the SCADA input 58 to SSC 29, and is conditioned by the algorithm depicted in FIG. 3 to provide the resultant Set Power value. This Set Power value on lead 90 is compared with the Kw Capacity value on lead 88 at lesser select function 91, and the lesser of the two is then available as the control signal DISPKW to command the level of power to be dispatched by that power plant 18. The output of lesser select 91 may be extended through GIC ramp logic 92, such that the DISPKW signal on lead 93 will change levels at a predetermined rate so as to insure relatively smooth power transitions, particularly when transitioning between G/C and G/I modes. Each Kw Capacity signal is passed through the PCS of a power plant and, from a current transducer in the PCS, is passed to LSC 34 via lead 36. Each DISPKW signal on a lead 93 represents a command signal sent from a respective PPC to a respective PCS for regulating the Kw power output of the respective power plant 18.

Figure 3:
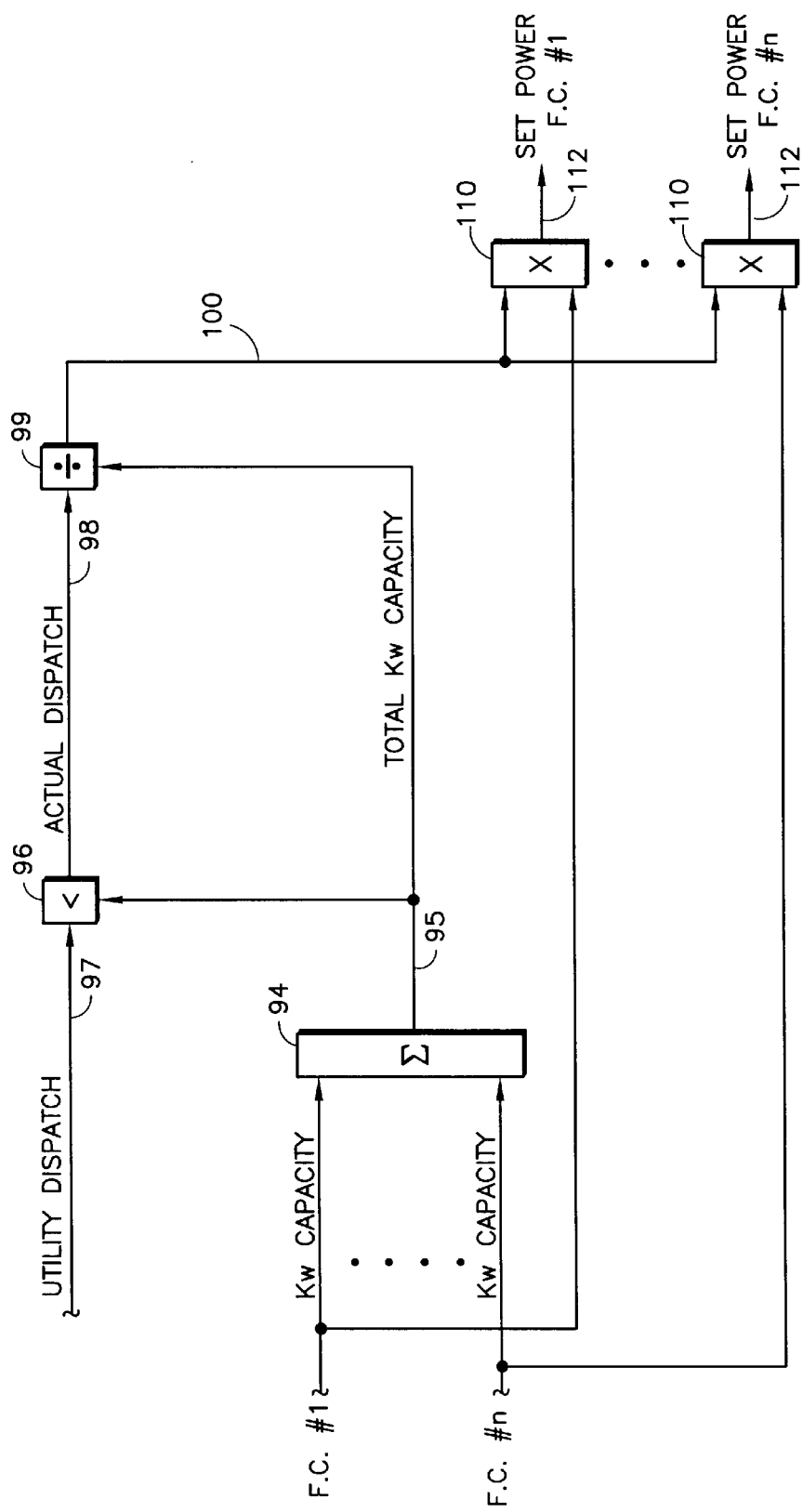
FIG. 3 is a generalized, functional schematic block diagram algorithmically illustrating the power dispatch loading of multiple fuel cell power plants when operating in the G/C mode.

Referring to FIG. 3, there is a generalized functional schematic block diagram of logic, typically in the SSC 29, that determines the power dispatch loading of the multiple (1 through n) power plants 18 when operating in the G/C mode. The Kw Capacity signals for/from each of the n fuel cell power plants 18 are cumulatively applied as inputs to a summer 94 to provide a Total Kw Capacity signal as the output on lead 95. This signal represents the total power generating capacity of the power system 8 at that moment. The Total Kw capacity signal is provided as one input to a lesser select function 96, with another input being a UTILITY DISPATCH signal on lead 97. The UTILITY DISPATCH signal may be derived from a demand signal received from the utility via SCADA line 58. The output of the lesser select 96 appears on line 98, and is thus the ACTUAL DISPATCH value. In other words, the actual dispatch value is the lesser of those two input values, and can never be more than the Total Kw Capacity. The ACTUAL DISPATCH value is then ratioed with, or divided by, the Total Kw Capacity value in the division function block 99 to provide an output value represented on lead 100. In the event the UTILITY DISPATCH value is equal to or greater than the Total Kw Capacity value, the output 100 will be unity (one), whereas if the UTILITY DISPATCH request is less, then the output 100 will have some fractional value less than one. This value on line 100 may be deemed a weighting, or pro rating, factor. It is applied as an input to each of n multiplier function blocks 110, which function blocks have the Kw Capacity value for that respective power plant as their other input. The products of these multiplication functions are the respective SET POWER signal values appearing as outputs on lines 112, and used as the SET POWER value on line 90 in FIG. 2. In this way, the SET POWER demand signal for each power plant 18 (1 through n), is the ratioed amount of that plant's Kw capacity, and can never be greater than its capacity. In the instances when the UTILITY DISPATCH value is equal to or greater than the Total Kw Capacity, each plant will be loaded to its present maximum capacity. Conversely, if the ratio is less than unity, each plant will be loaded to that ratioed amount of its present capacity.

An alternative to the algorithm depicted with respect to FIG. 3 is one which initially assumes that all power plants have equal capacity and thus, divides the UTILITY DISPATCH request value by the number of fuel cell power plants (n) to obtain an initial "per power plant" dispatch value. The relevant logic then compares the Kw Capacity signal for the first power plant 18 (#1) with the initial "per power plant" dispatch value and, if sufficient capacity exists, the requested value is put in that power plant's power dispatch register. The same is done for the remaining fuel cell power plants (#2 through n). If a particular fuel cell power plant 18 is limited and can not supply the full requested "per power plant" dispatch value, then it is loaded to its power-limited capacity and the remainder is stored in an overflow register or the like. When all fuel cells 18 have been polled and loaded based on their respective kilowatt generating capacities, then the Kw amount accumulated and stored in the overflow register is distributed amongst the fuel cells 18 with remaining, or extra, power generating capacity, using the same logic as described above. This process continues iteratively until either the entire dispatch request has been assigned to the power plants 18 or no additional capacity remains for the overflow dispatch request. If the latter occurs, an alarm message is sent to the utility's dispatch center via line 58, stating that the power request exceeds the current generating capacity of the site.

During operation of the site-based power system 8 in the G/C mode, not only is the total capacity of the n fuel cell power plants 18 available to supply the demands of the local customer loads 14, but the nominally "infinite" resource of the utility grid 10 is also available. However, when operating in the G/I mode, the maximum power available is that represented by the Total Kw Capacity value 95 depicted in FIG. 3. In such instance, if the actual total power demand of the collective loads 14 ($L_1, L_2, \ldots L_x$) is greater than the Total Kw Capacity value, as because the latter is reduced because of power "foldbacks" at the power plants 18, some administrative action must be taken. According to an aspect of the invention, the customer loads 14 are arranged, or identified, according to a schedule of priorities. In the most refined instance, each of the total X number of loads has its own different relative priority. Alternatively, the loads 14 may be grouped, as for instance in high, medium, and low priority groups.

Then, in one embodiment, the total power demand of the loads 14, as indicated by the signal 69 from Utility Power Meter 68, is conveyed to SSC 29 where it is compared with the Total Kw Capacity signal 95 (of FIG. 3) to determine whether or not there is sufficient capacity to meet the instant demand of the loads. If there is, then that demand is met according to the established system load-sharing algorithm in SMC 31. However, if that comparison, by subtraction or ratio or other convenient means, indicates that the instant load demand is greater than the Total Kw Capacity, a load shedding condition arises. This is done in accordance with the previously determined schedule of priorities, by disconnecting (shedding) certain ones, or groups, of the loads 14 ($L_1, L_2, \ldots L_x$) by selective actuation (opening) of the respective individual load contactors 13 (1, 2, ... X) by the control signals represented by lead 70 between the LSC 34 and the contactors 13. The LSC 34, in conjunction with SSC 29, will then use the load priority schedule to actuate (open) those contactors 13 required to disconnect the lower priority loads and retain connected the more critical, higher priority loads. In one configuration, the loads can be shed sequentially by priority through an iterative process until the demand can be met by the Total Kw Capacity. In another, more sophisticated, arrangement, the instant demand of the load associated with each separate contactor 13 (1, 2, ... X) might be determined by associating power meters with each contactor and using the information to compute, according to the priority schedule, which loads to disconnect in a single disconnection action. Of course, with either configuration, because the usage pattern of the loads 14 may be constantly changing as loads are "turned on and off" by the user, it is necessary to continually repeat this analysis and control action in the G/I mode to avoid overloading. When a power foldback condition is removed and/or certain higher priority loads are removed or "turned off", some or all of the lower priority loads previously shed may be reconnected to the load power line 39. In this way, the most critical customer loads always have power.

Although the invention has been described and illustrated with respect to the exemplary embodiments thereof, it should be understood by those skilled in the art that the foregoing and various other changes, omissions and additions may be made without departing the spirit and scope of the invention. For instance, the logic functions depicted in FIGS. 2 and 3, as well as the many other logic functions performed by the invention, may be done with dedicated logic or via programmable logic circuitry, with the latter in the extreme instance being performed via one or more appropriately programmed computers.

What is claimed is:

1. A fuel cell-powered generating system (8) at a site for inclusion as a distributed generating resource in a distributed generation utility power grid (10), comprising:
   a. multiple fuel cell power plants ($18_{1-n}$) at the site;
   b. at least one electrical load (14) located substantially at the site; and
   c. a site management system (11) operatively connected to each of the multiple fuel cell power plants ($18_{1-n}$), the at least one load (14), and the utility grid (10) for controlling the multiple fuel cell power plants ($18_{1-n}$) in an integrated manner, in, alternatively:
      i. a grid connected mode of operation having the fuel cell power plants (18) connected to the at least one load (14) and to the power grid (10), and
      ii. a grid independent mode of operation having the fuel cell power plants (18) connected to the at least one load (14) independent of connection to the power grid (10).

2. The fuel cell-powered generating system (8) of claim 1 wherein each fuel cell power plant (18) includes a fuel cell and associated sub-systems (F. C.) for generating power, a power plant controller (PPC) for controlling and monitoring the condition of the fuel cell and support sub-systems (F. C.), and a power conditioning system (PCS) for conditioning the power provided by the fuel cell to the loads, the power plant controller (PPC) further including signal processing logic (77, 79, 81, 85, 87) responsive to signals indicative of the monitored condition of the fuel cell and support sub-systems (F. C.) for providing a signal (Kw Capacity—88) representative of the instant power output capacity of the respective fuel cell power plant (18), and wherein the site management system (11, 94) is responsive to the instant power output capacity signals (Kw capacity—88) from each of the fuel cell power plants (18) for providing a signal (Total Kw Capacity—95) representative of the total instant power output capacity of the multiple fuel cell power plants ($18_{1-n}$).

3. The fuel cell-powered generating system (8) of claim 2, further including a utility dispatch signal (58, 97) received from the utility, and wherein the site management system (11) includes signal processing means (96, 97, 110) responsive to the utility dispatch signal (58, 97) and the Total Kw Capacity signal (95) for selecting the lesser thereof to provide an Actual Dispatch signal (98) and for comparing the Actual Dispatch signal (98) with the Total Kw Capacity signal (95) to provide a pro-rated dispatch signal (100), and responsive to the pro-rated dispatch signal (100) and to the Kw Capacity signals (88) from each of the respective fuel cell power plants (18) to provide respective Set Power control signals (112, 90) for controlling the dispatch power for each respective fuel cell power plant ($18_{1-n}$).

4. The fuel cell-powered generating system (8) of claim 3 wherein the signal processing means (96, 97, 110) of the site management system (11) determines the mathematical product of the pro-rated dispatch signal (100) and each of the Kw Capacity signals (88) from each of the respective fuel cell power plants (18), to provide each of the respective Set Power Control signals (112, 90).

5. The fuel cell-powered generating system (8) of claim 1, further including a utility dispatch signal (58, 97) received from the utility, each fuel cell power plant (18) including a fuel cell and associated sub-systems (F. C.) for generating power, a power plant controller (PPC) for controlling and monitoring the condition of the fuel cell and support sub-systems (F. C.), and a power conditioning system (PCS) for conditioning the power provided by the fuel cells to the loads, the power plant controller (PPC) further including signal processing logic (77, 79, 81, 85, 87) responsive to the signals indicative of the monitored condition of the fuel cell and support sub-systems (F. C.) for providing a signal (Kw Capacity—88) representative of the instant power output capacity of the respective fuel cell power plant (18), and wherein the site management system (11) includes signal processing means for dividing the utility dispatch signal (58, 97) by the multiple number of fuel cell power plants (18) to provide an initial per power plant dispatch signal value, for comparing the Kw Capacity signal (88) for an initial fuel cell power plant (18) with the per power plant dispatch signal value and assigning to that plant as much of the per power plant dispatch signal value as allowed by the respective Kw Capacity signal (88), for storing any remainder value in overflow storage, for similarly comparing and assigning to each successive one of the multiple fuel cell power plants (18) as much of the per power plant dispatch signal value as allowed by the respective Kw Capacity signal (88) and storing any respective remainder value, and for iteratively repeating the foregoing functions to allocate any remainder value remaining in the overflow storage.

6. The fuel cell-powered generating system (8) of claim 2, wherein the site management system (11) includes a power monitor (68) for providing a signal (69) representative of the total power demand of the connected loads ($14_{L1-LX}$), and further signal processing logic (34, 29) for comparing the total power demand signal (69) and the Total Kw Capacity signal (95) and, if and to the extent the total power demand exceeds the Total Kw Capacity, shedding one or more loads ($14_{L1-LX}$) in accordance with a predetermined schedule.

7. The fuel cell-powered generating system (8) of claim 6, wherein each of the multiple loads ($14_{L1-LX}$) is connected to the fuel cell power plants (18) through respective selectively controlled contactors ($13_{L1-Lx}$), and wherein said shedding of one or more of the loads is effected by selectively opening respective ones of the contactors ($13_{L1-Lx}$).

8. The fuel cell-powered generating system (8) of claim 1, wherein the site management system (11) is connected to receive dispatch signals from and provide status signals to, the remote utility via communications linkage (58, 62, 64, 61) connected between the site management system (11) and the utility.

9. The fuel cell-powered generating system (8) of claim 8, wherein the site management system includes a site supervisory controller (29) for effecting the integrated control of the multiple fuel cell power plants (18) and providing the control interface with the utility.

10. The fuel cell-powered generating system (8) of claim 9, wherein the site management system (11) includes a means (60) operatively connected with the site supervisory controller (29) for manually selecting operation of the generating system (8) either in a local operating mode in which the multiple power plants (18) are controlled individually or in a supervisory operating mode in which the multiple power plants (18) are operated in a unified manner.

11. The fuel cell-powered generating system (8) of claim 1, wherein the site management system (11) comprises a site supervisory controller (29) for effecting the integrated control of the multiple fuel cell power plants (18), a load shed controller (34) connected (38, 70) to interact with the site supervisory controller (29) and the loads (14, 13) to control load shedding, and a site management controller (31) connected to each of the fuel cell power plants (18) for controlling the power provided by the power plants (18) to the loads (14).

12. The fuel cell-powered generating system (8) of claim 2, wherein the site management system (11) comprises a site supervisory controller (29) for establishing, in response to a power dispatch signal from the utility, the power dispatch loading of the fuel cell power plants (18) in an integrated manner when operating in the grid connected mode, a load shed controller (34) connected (38, 70) to interact with the site supervisory controller (29) and the loads (14, 13), and a site management controller (31) connected to the PCSs of each of the respective fuel cell power plants (18) for controlling the transition of each fuel cell power plant (18) from operation in one of the grid connected and the grid independent modes, to operation in the other.

13. The fuel cell-powered generating system (8) of claim 12, wherein said site management system (11) further includes high speed, static switching means (12) connected to the utility grid (10), the fuel cell power plants (18, 15), and the loads (14, 13, 39) for rapidly disconnecting the loads (14) and the fuel cell power plants (18) from the utility grid (10) and transitioning from the grid connected mode of operation to the grid independent mode of operation.

14. The fuel cell-powered generating system (8) of claim 2, wherein initial power rating signals (Kw Rating—76) representative of a base power capacity are provided for each of the multiple fuel cell power plants ($18_{1-n}$), and the signal processing logic (77, 79) is responsive to the monitored condition of each of the respective fuel cells and support sub-systems (F. $C._{1-n}$) to foldback the base power capacity (Kw Rating—76) of the respective power plant (18) by an amount predetermined in accordance with the monitored condition to thereby provide the respective instant power output capacity signal value (Kw Capacity—88).

15. A fuel cell-powered generating system (8) at a site for inclusion as a distributed generating resource in a distributed generation utility power grid (10), comprising:

a. multiple fuel cell power plants ($18_{1-n}$) at the site;

b. at least one electrical load (14) located substantially at the site;

c. a site management system (11) operatively connected to each of the multiple fuel cell power plants (18), the at least one load (14), and the utility grid (10) for controlling the multiple fuel cell power plants ($18_{1-n}$) in an integrated manner, in, alternatively:

i. a grid connected mode of operation having the fuel cell power plants (18) connected to the at least one load (14) and to the power grid (10), and ii. a grid independent mode of operation having the fuel cell power plants (18) connected to the at least one load (14) independent of connection to the power grid (10), and wherein each fuel cell power plant (18) includes a fuel cell and associated sub-systems (F. C.) for generating power, a power plant controller (PPC) for controlling and monitoring the condition of the fuel cell and support sub-systems (F. C.), and a power conditioning system (PCS) for conditioning the power provided by the fuel cell to the loads, the power plant controller (PPC) further including signal processing logic (77, 79, 81, 85, 87) responsive to signals indicative of the monitored condition of the fuel cell and support sub-systems (F. C.) for providing a signal (Kw Capacity—88) representative of the instant power output capacity of the respective fuel cell power plant (18).

16. The fuel cell-powered generating system (8) of claim 15, wherein said site management system (11) further includes high speed, static switching means (12) connected to the utility grid (10), the fuel cell power plants (18, 15), and the loads (14, 13, 39) for rapidly disconnecting the loads (14) and the fuel cell power plants (18) from the utility grid (10) and transitioning from the grid connected mode of operation to the grid independent mode of operation.

17. A fuel cell-powered generating system (8) at a site for inclusion as a distributed generating resource in a distributed generation utility power grid (10), comprising:

d. multiple fuel cell power plants ($18_{1-n}$) at the site;

e. at least one electrical load (14) located substantially at the site; and f. a site management system (11) operatively connected to each of the multiple fuel cell power plants ($18_{1-n}$), the at least one load (14), and the utility grid (10) for controlling the multiple fuel cell power plants ($18_{1-n}$) in an integrated manner, in, alternatively:

i. a grid connected mode of operation having the fuel cell power plants (18) connected to the at least one load (14) and to the power grid (10), and ii. a grid independent mode of operation having the fuel cell power plants (18) connected to the at least one load (14) independent of connection to the power grid (10), wherein the site management system (11) further includes high speed, static switching means (12) connected to the utility grid (10), the fuel cell power plants (18, 15), and the loads (14, 13, 39) for rapidly disconnecting the loads (14) and the fuel cell power plants (18) from the utility grid (10) and transitioning from the grid connected mode of operation to the grid independent mode of operation to substantially continuously maintain power to the loads (14) from the fuel cell power plants (18).

* * * * *